United States Patent
Ichikawa et al.

(10) Patent No.: US 9,339,985 B2
(45) Date of Patent: May 17, 2016

(54) TRANSFER MOLD BODY

(71) Applicant: KABUSHIKI KAISHA TOKAI-RIKA-DENKI-SEISAKUSHO, Aichi-ken (JP)

(72) Inventors: Takashi Ichikawa, Aichi-ken (JP); Eiji Yamada, Aichi-ken (JP); Atsushi Tsukihara, Aichi-ken (JP); Kenichi Sugisaka, Aichi-ken (JP); Ryusuke Sadamatsu, Aichi-ken (JP); Katsuyuki Imaeda, Aichi-ken (JP); Soichiro Ogawa, Aichi-ken (JP)

(73) Assignee: KABUSHIKI KAISHA TOKAI-RIKA-DENKI-SEISAKUSHO, Aichi-ken (JP)

( * ) Notice: Subject to any disclaimer, the term of this patent is extended or adjusted under 35 U.S.C. 154(b) by 239 days.

(21) Appl. No.: 13/906,716

(22) Filed: May 31, 2013

(65) Prior Publication Data

US 2013/0323462 A1 Dec. 5, 2013

(30) Foreign Application Priority Data

Jun. 5, 2012 (JP) ................................ 2012-127740

(51) Int. Cl.
| | |
|---|---|
| *B32B 3/06* | (2006.01) |
| *B32B 7/06* | (2006.01) |
| *B32B 1/00* | (2006.01) |
| *B32B 3/02* | (2006.01) |
| *B32B 3/30* | (2006.01) |

(52) U.S. Cl.
CPC ... *B32B 3/06* (2013.01); *B32B 1/00* (2013.01); *B32B 3/02* (2013.01); *B32B 3/30* (2013.01); *B32B 7/06* (2013.01); *B32B 2419/00* (2013.01); *B32B 2451/00* (2013.01); *B32B 2605/003* (2013.01); *Y10T 428/24264* (2015.01)

(58) Field of Classification Search
CPC ........................... Y10T 428/24277; B32B 3/06
USPC ............................................ 156/87; 428/143
See application file for complete search history.

(56) References Cited

U.S. PATENT DOCUMENTS

| | | | | | |
|---|---|---|---|---|---|
| 3,836,414 | A | * | 9/1974 | Staats | .............................. 156/87 |
| 5,346,569 | A | * | 9/1994 | Simon | .............................. 156/87 |

FOREIGN PATENT DOCUMENTS

| | | |
|---|---|---|
| JP | 06-15945 A | 1/1994 |
| JP | 2000-006599 A | 1/2000 |
| JP | 2009-126046 A | 6/2009 |
| JP | 2012-035550 A | 2/2012 |

OTHER PUBLICATIONS

Office Action Issued in a corresponding Japanese Application No. 2013-127740 on Dec. 16, 2014.

* cited by examiner

*Primary Examiner* — William P Watkins, III
(74) *Attorney, Agent, or Firm* — Roberts Mlotkowski Safran & Cole, PC (57) ABSTRACT

A transfer layer is transferred well to a step portion. In a transfer mold body, a projection and indentation portion is formed to a front face of a bottom wall of a step portion. When covering a transfer film over a base member, air between the transfer film and the step portion is accordingly expelled from between indented portions of the projection and indentation portion and the transfer film at an edge portion of the bottom wall. The transfer film can accordingly be covered over the step portion whilst suppressing air from remaining between the transfer film and the step portion. A transfer layer of the transfer film can accordingly is transferred well to the front face of the step portion.

6 Claims, 7 Drawing Sheets

TRANSFER MOLD BODY

CROSS-REFERENCE TO RELATED APPLICATION

This application claims priority under 35 USC 119 from Japanese Patent Application No. 2012-127740 filed Jun. 5, 2012, the disclosure of which is incorporated by reference herein.

BACKGROUND OF THE INVENTION

1. Field of the Invention

The present invention relates to a transfer mold body provided with a transfer layer.

2. Related Art

Japanese Patent Application Laid-Open (JP-A) No. 06-15945 discloses a transfer method in which a transfer layer is transferred to a boy to be transferred (transfer mold body). More specifically, a transfer member including a transfer layer and a base film is disposed facing the body to be transferred, and the base film is separated from the transfer layer after applying heat and pressure to the transfer member, thereby transferring the transfer layer to the body to be transferred.

Figure 7:
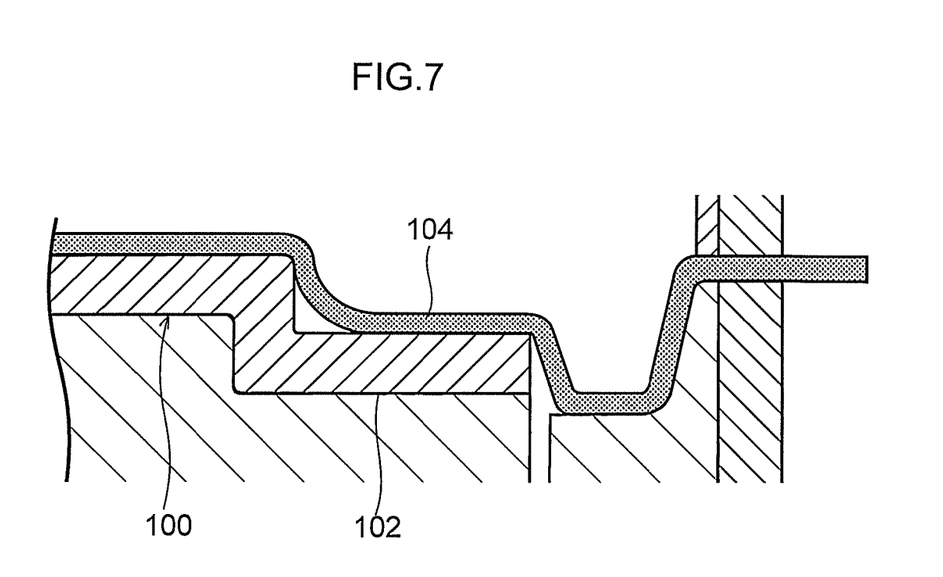
FIG. 7 is an explanatory diagram to explain related art.

However, as shown in FIG. 7 of the present application, in a case in which a step portion 102 is formed at an outer peripheral portion of a boy to be transferred 100, there is a possibility that the transfer layer may not transfer well onto the front face of the step portion. Namely, for example when the transfer layer is being transferred to the front face of the boy to be transferred 100 with using a transfer film 104, air between the transfer film 104 and the step portion 102 is not completely expelled from an edge portion of the step portion 102, and the step portion 102 is covered by the transfer film 104 in a state in which air remains between the transfer film 104 and the step portion 102.

SUMMARY OF THE INVENTION

In consideration of the above circumstances, the present invention is to provide a transfer mold body that enables good transfer of a transfer layer to a step portion.

A transfer mold body of a first aspect of the present invention includes: a base member including a main body portion whose surface (front surface side) is configured as a design face; a step portion that is integrally provided at an outer peripheral portion of the main body portion, and that includes a side wall extending in a plate-thickness direction of the main body portion towards the opposite side of the design face, and a bottom wall spreading from the side wall towards the outside of the main body portion; a projection and indentation portion that is formed on a surface of the bottom wall, and formed continuously spreading (across) from a boundary of the side wall and the bottom wall to an edge portion of the bottom wall; and a transfer layer that is formed on the surface of the main body portion and the step portion.

In the transfer mold body of the first aspect, the base member includes the main body portion, in the main body portion, the surface (front surface) side is configured as the design face. The outer peripheral portion of the main body portion is integrally formed with the step portion configured by the side wall and the step portion. The side wall extends from the main body portion towards the opposite side to the design face in plate thickness direction of the main body portion, and the bottom wall extends from the side wall towards the main body portion outside. The transfer layer is formed on the surface of the main body portion and the step portion.

The surface of the bottom wall of the step portion is formed with the projection and indentation portion. The projection and indentation portion is formed continuously so as to extend from the boundary of the side wall and the bottom wall to the edge portion of the bottom wall. Accordingly, for example when transfer of the transfer layer to the transfer mold body using a transfer film that includes the transfer layer, the transfer film is disposed on the bottom wall of the step portion, forming gaps between the indentation portions of the projection and indentation portion and the transfer film. Air between the transfer film and the bottom wall portion is expelled from the gaps at the edge portion of the step portion by for example applying pressure to the surface of the transfer film. The transfer film can accordingly be covered on the step portion whilst suppressing air from remaining between the transfer film and the bottom wall. Accordingly, good transfer is enabled of the transfer layer of the transfer film to the surface of the step portion.

A transfer mold body of a second aspect of the present invention is the transfer mold body of the first aspect wherein the projection and indentation portion is configured with a texture pattern of a projected and indented profile.

In the transfer mold body of the second aspect, due to configuring the projection and indentation portion with a texture pattern, the projection and indentation portion can be formed easily for example by texturing a mold that molds the base member.

A transfer mold body of a third aspect of the present invention is the transfer mold body of either the first aspect or the second aspect wherein a portion of the surface of the bottom wall portion is formed with a flat portion that is flat.

In the transfer mold body of the third aspect, the flat profiled flat portion is formed on a portion of the surface of the bottom wall portion. Namely, the surface of the bottom wall portion is configured including the flat portion and the projection and indentation portion. Accordingly, for example in a case in which an adjacent member adjacent to the transfer mold body is disposed and assembled on the step portion, the flat portion can be made to function as a seating face. The adjacent member can accordingly be disposed stably on the step portion.

A transfer mold body of a fourth aspect of the present invention is the transfer mold body of any one of the first aspect to the third aspect wherein the transfer mold body is configured as an interior member of a vehicle.

In the transfer mold body of the fourth aspect, good transfer of the transfer layer to the step portion is possible even if a step portion is formed at an outer peripheral portion of a vehicle interior member since the transfer mold body is used as the vehicle interior member.

Further, it is possible in the aspects that the projection and indentation portion structured by projections and indentations.

The transfer mold body of the first aspect enables good transfer of the transfer layer to the step portion.

The transfer mold body of the second aspect enables the projection and indentation portion to be formed easily to the bottom wall.

The transfer mold body of the third aspect enables the flat portion to function as a seating face for example in a case in which the adjacent member adjacent to the transfer mold body is disposed and assembled on the step portion.

The transfer mold body of the fourth aspect enables good transfer of the transfer layer to the step portion even if the step portion is formed at the outer peripheral portion of the vehicle interior member.

BRIEF DESCRIPTION OF THE DRAWINGS

Embodiments of the invention will be described in detail with reference to the following figures, wherein:

FIG. 5A to FIG. 5C are explanatory diagrams to explain the covering of a transfer film over a base member.

DETAILED DESCRIPTION OF THE INVENTION

Explanation first follows regarding a transfer mold body 10 according to an exemplary embodiment of the present invention, followed by explanation regarding a transfer apparatus 30 for manufacturing the transfer mold body 10.

Regarding the Transfer Mold Body 10

Figure 1:
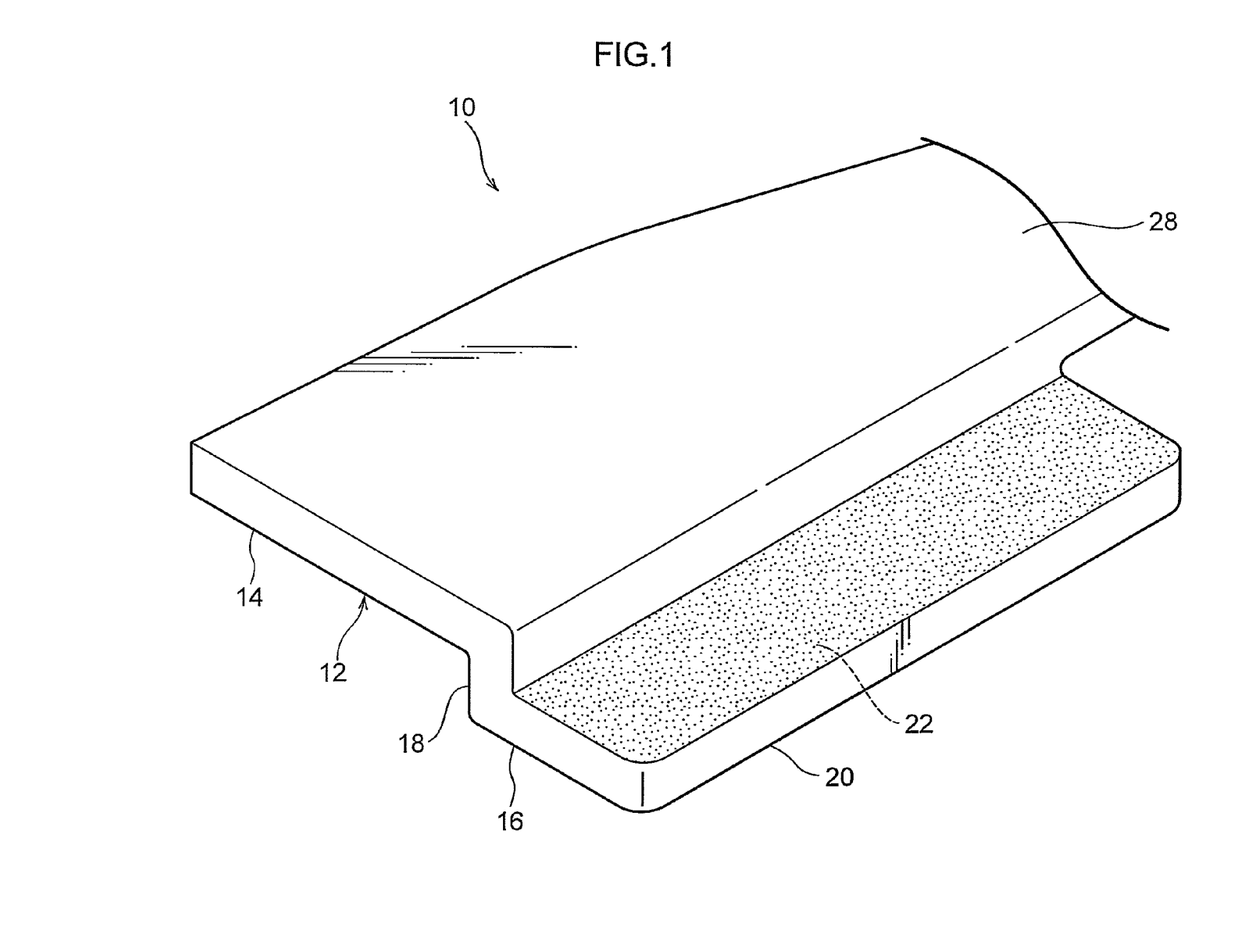
FIG. 1 is a perspective view illustrating a portion of a transfer mold body according to a present exemplary embodiment.
Figure 2A:
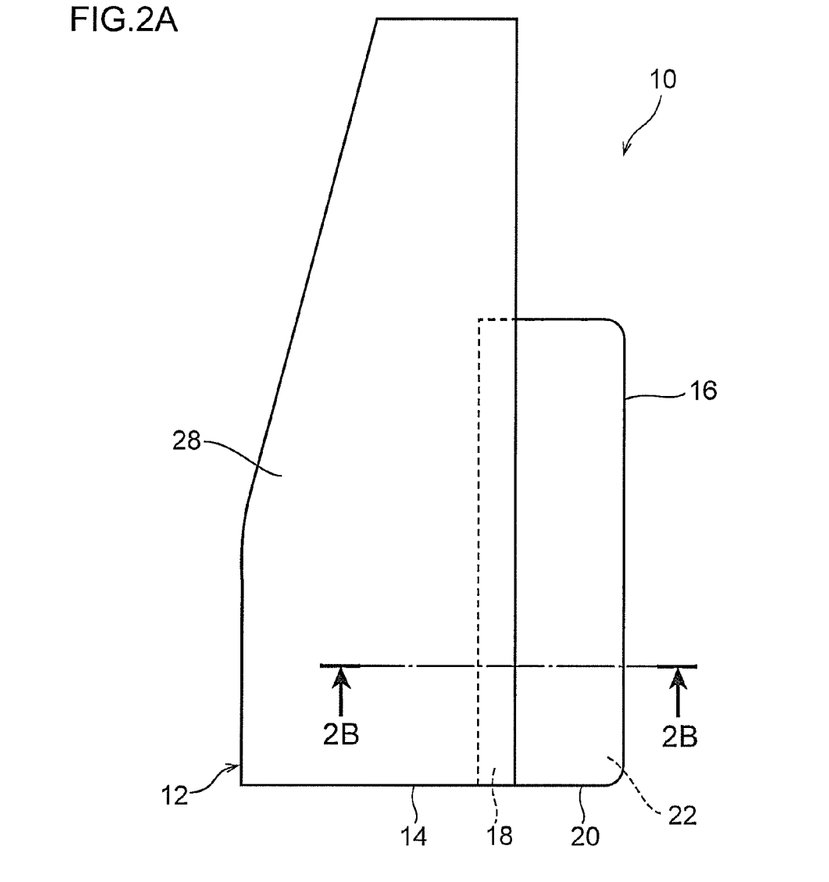
FIG. 2A is a plan view illustrating the transfer mold body illustrated in FIG. 1.
Figure 2B:
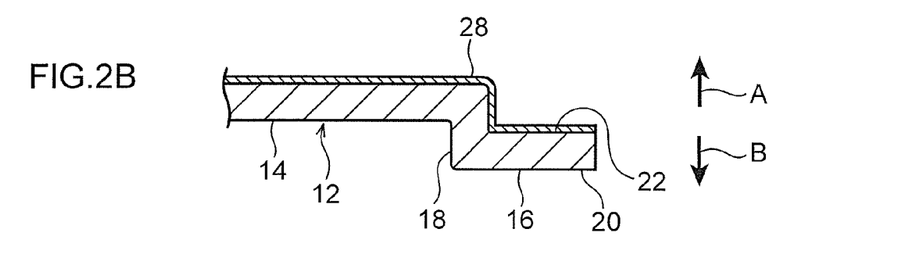
FIG. 2B is an enlarged side-on cross-section of a portion of the transfer mold body (a cross-section taken along line 2B-2B in FIG. 2A)

FIG. 1 is a perspective view illustrating a portion of the transfer mold body 10. FIG. 2A is a plan view illustrating the overall transfer mold body 10, and FIG. 2B is an enlarged cross-section illustrating a portion of the transfer mold body 10.

The transfer mold body 10 is for example applied to an interior member of a vehicle (such as a design panel assembled to an instrument panel or the like).

As shown in the drawings, the transfer mold body 10 is configured including a base member 12 and a transfer layer 28. The base member 12 is manufactured from a resin and includes a main body portion 14 and a step portion 16.

The main body portion 14 is formed in a substantially trapezoidal plate shape, with the step portion 16 integrally formed at an outer peripheral portion of the main body portion 14. The step portion 16 is configured including a side wall 18 and a bottom wall 20. The side wall 18 extends from the main body portion 14 towards one side in a plate thickness direction of the main body portion 14 (the arrow B direction side in FIG. 2B (towards a side opposite to a design face side)). The bottom wall 20 extends from a leading end portion of the side wall 18 towards the outside of the main body portion 14 (the opposite side to the main body portion 14), and is disposed parallel to the main body portion 14. Namely, the step portion 16 is bent into a substantially crank shape as viewed from the side, and a leading end of the step portion 16 is released (uncoupled).

A front face of the bottom wall 20 is configured with a projection and indentation portion (convex and concave portion) 22. In the projection and indentation portion 22, a texture pattern of projections and indentations (convexs and concaves), such as a satin finish pattern or a epidermis pattern (in the present exemplary embodiment, pattern corresponding to texture number TH122 or texture number TH112 from Tanazawa Hakkosha Co., Ltd.) is formed. The projection and indentation portion 22 is formed so as to continuously spread (across) from the boundary of the side wall 18 and the bottom wall 20 to an edge portion of the bottom wall 20 (see the range indicated with dots in FIG. 1).

The transfer layer 28 is formed on the surface of the main body portion 14 and the step portion 16 (the face at the arrow A direction side in FIG. 2B). The front face of the base member 12 is accordingly decorated by the transfer layer 28, with the front face of the transfer mold body 10 configuring a design face.

Figure 3:
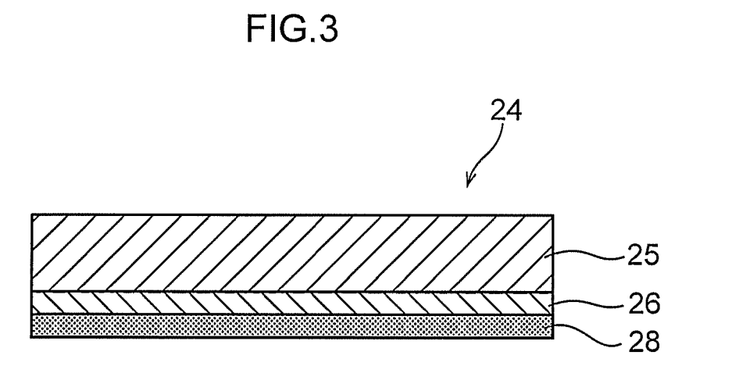
FIG. 3 is an enlarged cross-section illustrating a transfer film used in the transfer mold body illustrated in FIG. 1.

The transfer layer 28 is formed to the surface of the main body portion 14 and the step portion 16 by the transfer apparatus 30, described later, using a transfer film 24 illustrated in FIG. 3. As shown in FIG. 3, the transfer film 24 is configured including a film substrate (film base member) 25, a release layer 26 and the transfer layer (ink layer) 28. The release layer 26 and the transfer layer 28 are layered in sequence on the film substrate 25. In the transfer layer 28, a transfer pattern such as a wood-grain pattern is drawn by for example gravure printing. The transfer layer 28 is adhered to the main body portion 14 by heating to a specific temperature or higher thereafter the transfer layer 28 being cooled. The release layer 26 is formed from for example a silicone resin, so as to adjust the release force of the transfer layer 28 from the film substrate 25.

Regarding the Transfer Apparatus 30

Figure 4:
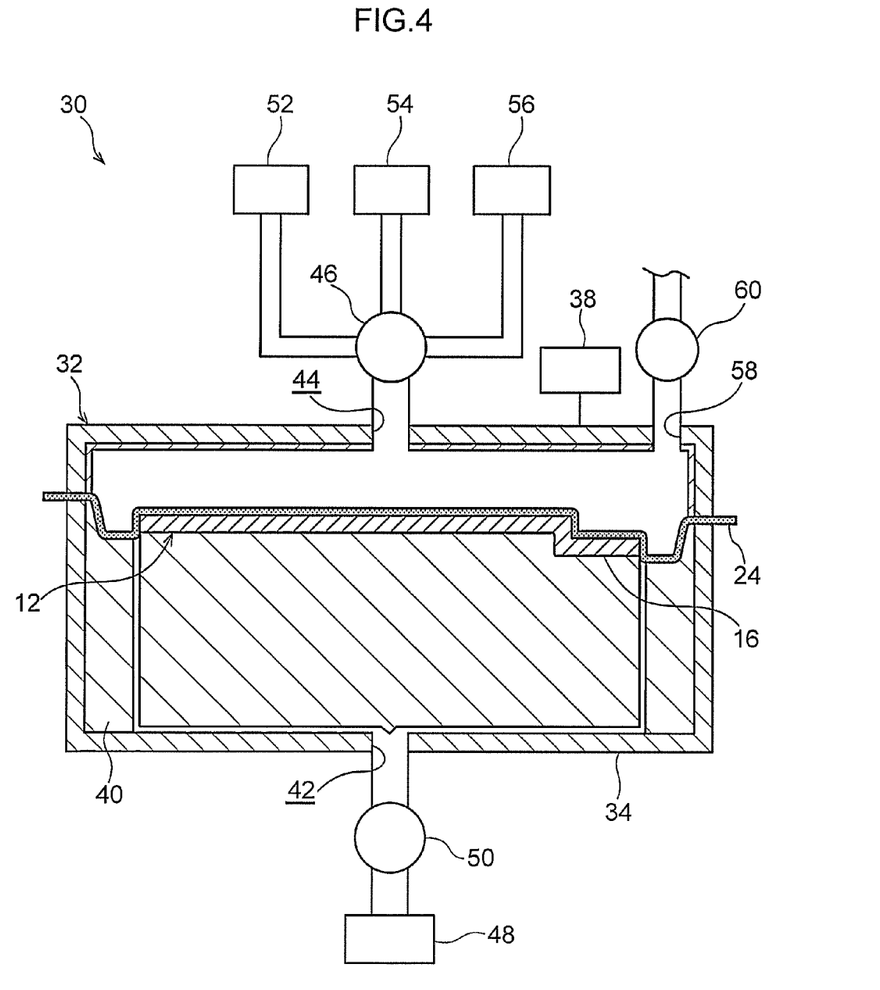
FIG. 4 is a schematic cross-section of a transfer apparatus that transfers a transfer layer to a base member illustrated in FIG. 2B.

As shown in FIG. 4, the transfer apparatus 30 is configured including a transfer mold 32, a vacuum pump 48, a vapor generator (vapor generating device) 52, a cooling device 54, and a pressurizer (pressing device) 56.

The transfer mold 32 is configured including a fixed mold 34 that configures a lower portion of the transfer mold 32 and a movable mold 36 that configures an upper portion of the transfer mold 32. The transfer mold 32 is formed in the shape of a substantially rectangular parallelopiped container. The fixed mold 34 and the movable mold 36 are disposed facing each other, with the movable mold 36 coupled to a mold clamp device 38 and configured movable in an up-down direction by the mold clamp device 38. Configuration is thus such that the interior of the transfer mold 32 can be opened up by moving the movable mold 36 upwards using the mold clamp device 38.

A setting platform 40 is fixed inside the fixed mold 34, and configuration is such that the base member 12 of the transfer mold body 10 is fixed to the setting platform 40 with the interior of the transfer mold 32 in an open state. Moreover, a lower wall of the fixed mold 34 is formed with an air removal hole (air exhaust hole) 42. The air removal hole 42 passes through (penetrates) inside the setting platform 40 and extends to edge portion of the base member 12. An upper wall of the movable mold 36 is formed with an blowing hole (jetting hole) 44. A valve 46 is in communication with the blowing hole 44.

The vacuum pump 48 is in communication with the air removal hole 42 through a valve 50. The vacuum pump 48 is configured so as to remove (discharge) air from between the base member 12 and the transfer film 24.

The vapor generator 52 is in communication with the blowing hole 44 through the valve 46. The vapor generator 52 generates for example saturated water vapor at atmospheric pressure (atmospheric pressure saturated water vapor), with configuration made such that the saturated vapor passes through the valve 46 and is blown (supplied) from the blowing hole 44.

The cooling device 54 and the pressurizer 56, described later, are also in communication with the blowing hole 44 through the valve 46. Configuration is made such that the blowing hole 44 can be switched between communication with one of the vapor generator 52, the cooling device 54 and the pressurizer 56 by using the valve 46.

The cooling device 54 is in communication with the blowing hole 44 through the valve 46. Configuration is made such that cool air is supplied into the transfer mold 32 from the blowing hole 44 by the cooling device 54 when the blowing hole 44 has been placed in communication with the cooling device 54 by the valve 46.

The pressurizer 56 is in communication with the blowing hole 44 through the valve 46. Configuration is made such that compressed air is supplied into the transfer mold 32 from the blowing hole 44 by the pressurizer 56 when the blowing hole 44 has been placed in communication with the pressurizer 56 by the valve 46.

The upper wall of the movable mold 36 is further formed with a discharge hole 58, and with a valve 60 connected to the discharge hole 58. Configuration is made such that the temperature of the compressed air and saturated vapor becomes lower when the valve 60 is opened, and liquid (drain) into which the saturated vapor has changed is drained from the movable mold 36 through the discharge hole 58 and the valve 60.

Explanation now follows regarding operation and advantageous effects of the present exemplary embodiment, whilst explaining a procedure for transferring (a transfer method of) the transfer layer 28 onto the base member 12 using the transfer apparatus 30.

Figure 5A:
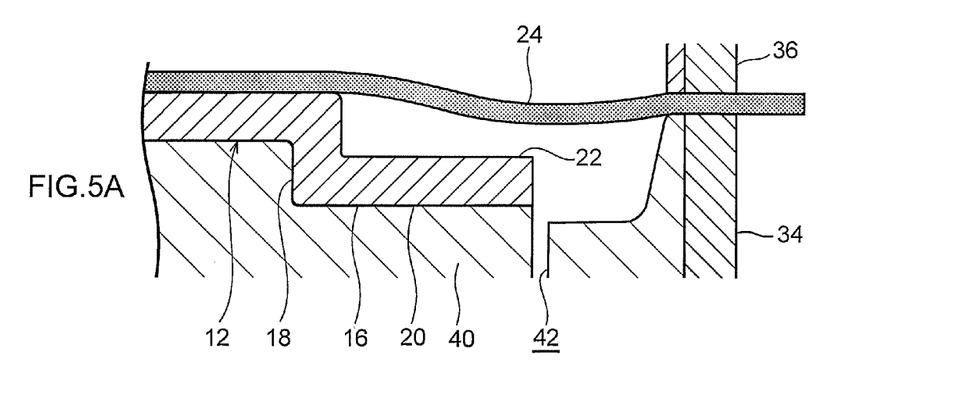
FIG. 5A is an explanatory diagram illustrating a state in which a transfer film has been disposed on the upper side of a base member.

Firstly, the movable mold 36 is moved upwards by the mold clamp device 38, opening up the interior of the transfer mold 32. The base member 12 is then fixed to the setting platform 40 and the transfer film 24 is disposed on the movable mold 36 side of the base member 12. The movable mold 36 is then moved downwards by the mold clamp device 38, thereby closing off the interior of the transfer mold 32. In this state, as shown in FIG. 5A, the transfer film 24 is arranged at the upper side of the base material 12.

Figure 5B:
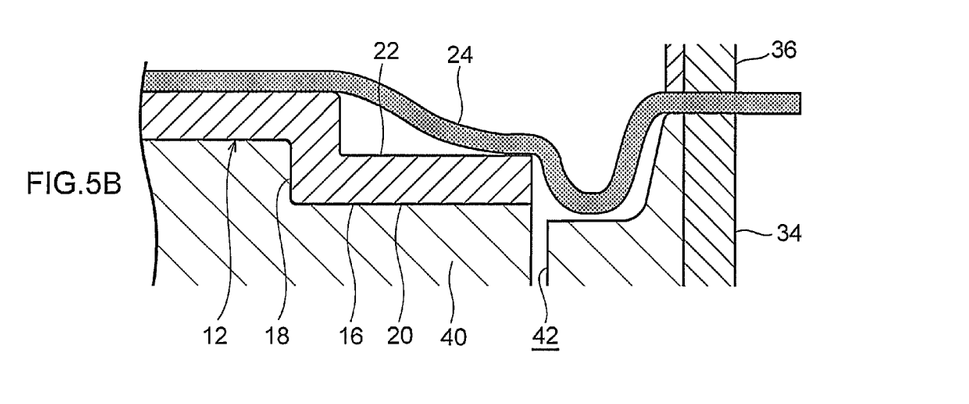
FIG. 5B is an explanatory diagram illustrating a state in which the transfer film has displaced towards the base member side and has contacted an edge portion of a step portion.

Thereafter, when air between the base member 12 and the transfer film 24 is started to be removed (exhausted) by using the vacuum pump 48, the pressure of the air between the base member 12 and the transfer film 24 is lowered, and the transfer film 24 is pressed by the pressure of the air in the transfer mold 32. The transfer film 24 is accordingly displaced towards the base member 12 side, and becomes a state such as contacting an edge portion of the step portion 16 in the base member 12 (see FIG. 5B).

Figure 5C:
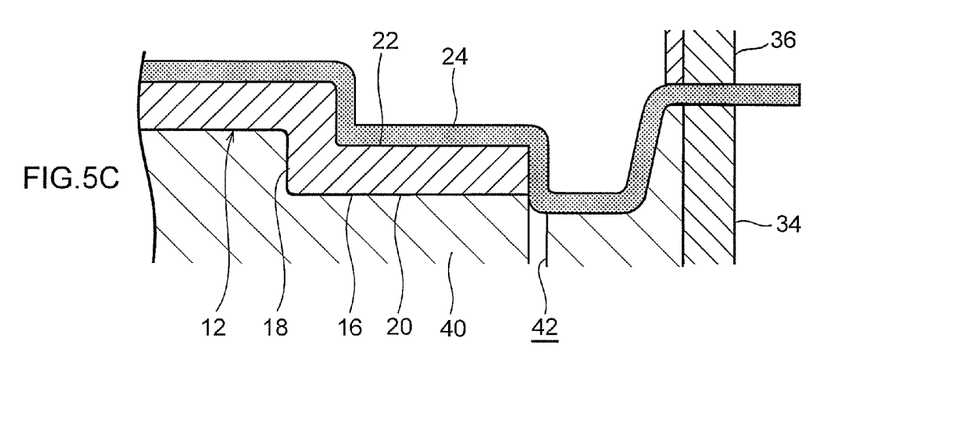
FIG. 5C is an explanatory diagram illustrating a covered state of the step portion by the transfer film.

The front face of the bottom wall 20 of the step portion 16 is formed with the projection and indentation portion 22 configured with the projected and indented profile textured pattern, and the projection and indentation portion 22 is formed so as to continuously spread (across) from the boundary of the side wall 18 and the bottom wall 20 to the edge portion of the bottom wall 20. Gaps are accordingly formed between the indentation (concave) portions of the projection and indentation portion 22 and the transfer film 24 at the edge portion of the step portion 16. Air between the transfer film 24 and the bottom wall 20 is accordingly expelled (discharged) from the gaps between the indentation portions of the projection and indentation portion 22 and the transfer film 24 at the edge portion of the step portion 16 by the vacuum pump 48, covering the transfer film 24 over the front face of the base member 12 (covering process) (see FIG. 5C).

In this state, the vapor generator 52 generates saturated vapor at atmospheric pressure, and this saturated vapor is supplied into the transfer mold 32 through the blowing hole 44. The transfer film 24 is accordingly heated to a specific temperature or above (heating process). Compressed air is then supplied into the transfer mold 32 by the pressurizer 56, tightly (closely) contacting the transfer film 24 (transfer layer 28) on the surface of the base member 12 (pressurization process).

Thereafter, cool air is supplied into the transfer mold 32 by the cooling device 54 through the blowing hole 44, thereby cooling the transfer film 24 and adhering the transfer layer 28 to the surface of the base member 12 (cooling process). The interior of the transfer mold 32 is opened up by moving the movable mold 36 upwards by using the mold clamp device 38.

Moreover, when the film base member 25 of the transfer film 24 is peeled from the transfer mold body 10, the mold release layer 26 separates together with the film base member 25 from the transfer layer 28 that is adhered to the front face of the main body portion 14 and the step portion 16, and the transfer layer 28 remains on the front face of the main body portion 14 and the step portion 16. The front face of the main body portion 14 and the step portion 16 is accordingly decorated with the transfer layer 28.

As explained above, due to forming the projection and indentation portion 22 to the front face of the bottom wall 20 of the step portion 16, air between the transfer film 24 and the step portion 16 is expelled from between the indented portions of the projection and indentation portion 22 and the transfer film 24 at the edge portion of the bottom wall 20 when the transfer film 24 is being covered over the base member 12. The transfer film 24 can accordingly be covered over the step portion 16 whilst suppressing air from remaining between the transfer film 24 and the step portion 16. Good transfer is accordingly enabled of the transfer layer 28 of the transfer film 24 to the front face of the step portion 16.

The projection and indentation portion 22 of the bottom wall 20 is configured with the texture pattern of projected and indented profile. The projection and indentation portion 22 can accordingly be easily formed to the front face of the bottom wall 20 by forming the base member 12 with using a mold at which texture pattern is formed.

Modified Example

Figure 6:
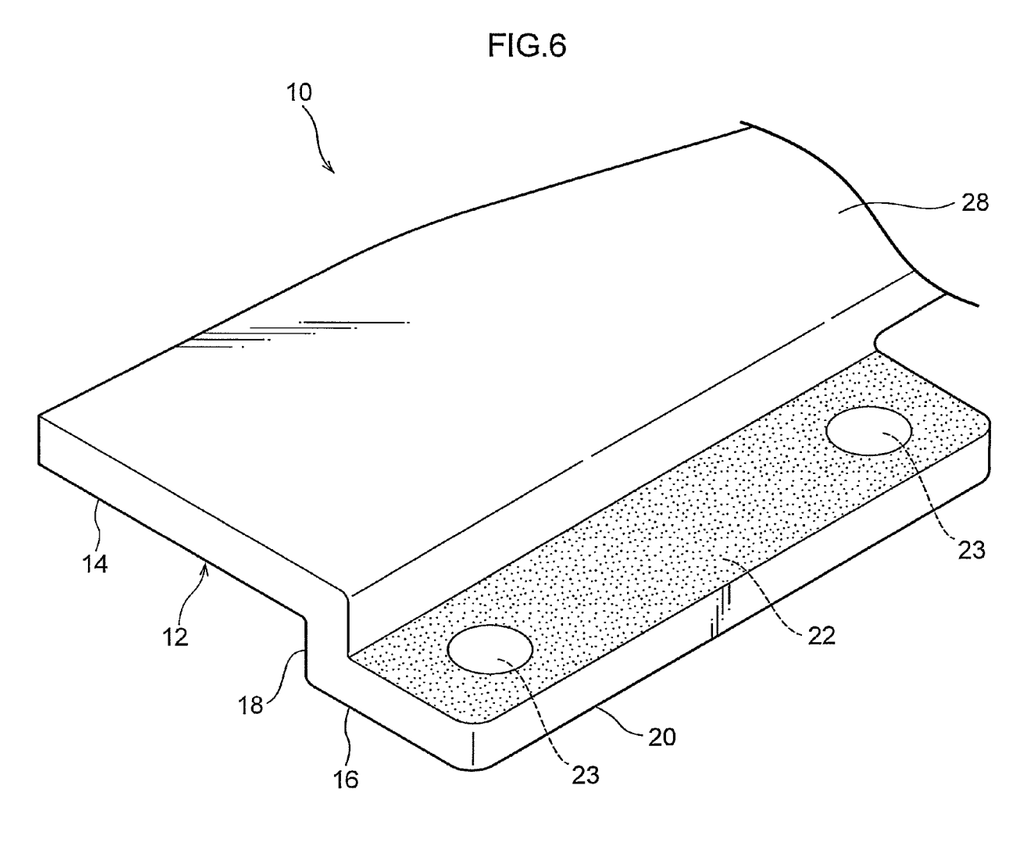
FIG. 6 is a perspective view illustrating a transfer mold body according to a modified example of the present exemplary embodiment.

As shown in FIG. 6, in a modified example, at a portion of the front face of the bottom wall 20, flat (plane) portions 23 are formed at two locations. The flat portions 23 are formed with substantially circular shapes in plan view, and are disposed slightly further towards the front face side of the main body portion 14 than the projection and indentation portion 22. Texture pattern is not formed on the flat portions 23. Namely, the flat portions 23 are formed with a flat profile (a plane profile).

Accordingly, the flat portions 23 can be made to function as seating faces in a case in which for example an adjacent member adjacent to the transfer mold body 10 is disposed and assembled on the bottom wall 20 of the step portion 16. The adjacent member can accordingly be disposed stably on the step portion 16.

Note that in the modified example, the flat portions 23 are formed with substantially circular shapes in plan view, however circular shaped through holes may be formed in the flat portions 23. So doing enables an adjacent member to be assembled to the step portion 16 using for example fixing members such as grommets.

Moreover, in the present exemplary embodiment and the modified example, the step portion 16 is formed with a step shape with respect to the main body portion 14, however the step portion 16 may be formed with a stairway profile.

Moreover, in the present exemplary embodiment and the modified example, the projection and indentation portion 22 is formed with a texture pattern, however the projected and indented profile of the projection and indentation portion 22 is not limited thereto. For example, the projection and indentation portion 22 may be formed with a projected and indented profile by forming grooves on the projection and indentation portion 22.

Moreover, in the present exemplary embodiment and the modified example, the transfer layer 28 of the transfer film 24 is transferred onto the base member 12 by lowering the pressure of air between the base member 12 and the transfer film 24 and performing the others with using the transfer apparatus 30, however the method for transferring the transfer layer 28 onto the base member 12 is not limited thereto. For example, the transfer film 24 can be floated in a water tank and the transfer layer 28 is transferred to the base member 12 by water pressure (in what is referred to as a "water pressure transfer method").

Moreover, in the present exemplary embodiment and the modified example, the projection and indentation portion 22 is formed so as to continuously span from the boundary of the side wall 18 and the bottom wall 20 to the entire edge portion of the bottom wall 20. Alternatively, the projection and indentation portion 22 may be formed so as to continuously span from the boundary of the side wall 18 and the bottom wall 20 to a portion of the edge portion of the bottom wall 20.

What is claimed is:

1. A transfer mold body comprising:
   a base member including a main body portion whose surface is configured as a design face;
   a step portion that is integrally provided at an outer peripheral portion of the main body portion, and that includes a side wall extending in a plate-thickness direction of the main body portion towards the opposite side of the design face, and a bottom wall extending from the side wall towards the outside of the main body portion such that the surface of the main body portion and a surface of the bottom wall are provided at different positions in the plate-thickness direction of the main body portion;
   a projection and indentation portion that is formed on only the surface of the bottom wall among the surface of the main body portion , a surface of the side wall and the surface of the bottom wall, the projection and indentation portion formed such that projections and indentations continuously spread from a boundary of the side wall and the bottom wall to an edge portion of the bottom wall; and
   a transfer layer that is continuously formed on the surface of the main body portion, the surface of the side wall and the surface of the bottom wall,
   wherein the transfer mold body is configured as an interior member of a vehicle.

2. The transfer mold body of claim 1, wherein the projection and indentation portion is configured with a texture pattern of a projected and indented profile.

3. The transfer mold body of claim 1, wherein a portion of the surface of the bottom wall portion is formed with a flat portion that is flat.

4. The transfer mold body of claim 2, wherein a portion of the surface of the bottom wall portion is formed with a flat portion that is flat.

5. The transfer mold body of claim 1, wherein in a cross-sectional view as seen from a side of the transfer mold body, the surface of the side wall and the surface of the bottom wall form a corner portion in the vicinity of the boundary of the side wall and the bottom wall, the corner portion having a concave shape.

6. The transfer mold body of claim 1, wherein in a plan view as seen from a transfer layer side, an area of the main body portion is larger than an area of the bottom wall.

\* \* \* \* \*